Figure 1:
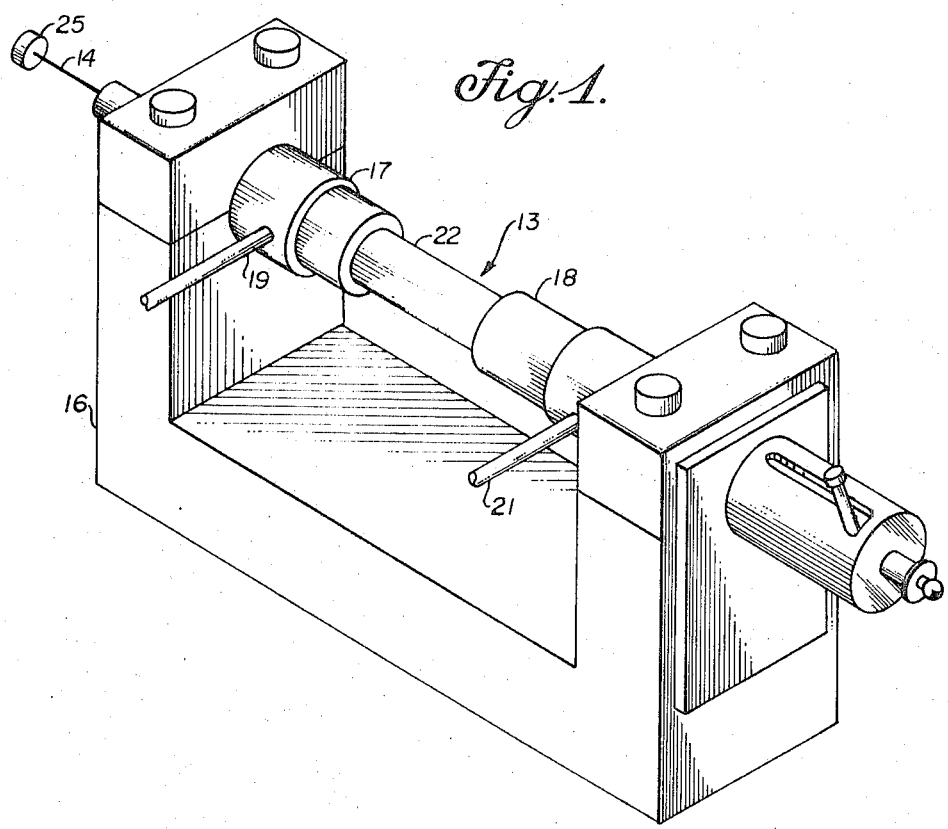

United States Patent [19]

Nickerson

[11] 3,860,506
[45] Jan. 14, 1975

[54] ELECTROPHORETIC PROCESS FOR COATING CERAMICS

[75] Inventor: Robert F. Nickerson, Livermore, Calif.

[73] Assignee: The United States of America as represented by the United States Atomic Energy Commission, Washington, D.C.

[22] Filed: Sept. 12, 1966

[21] Appl. No.: 578,895

[52] U.S. Cl. ............................. 204/181, 176/92 R
[51] Int. Cl. ............................................. B01k 5/02
[58] Field of Search .................... 204/181, 182, 183

[56] References Cited
UNITED STATES PATENTS 3,037,923   6/1962   Gnau ................................ 204/181

Primary Examiner—Leland A. Sebastian
Attorney, Agent, or Firm—John A. Horan; F. A. Robertson

[57] ABSTRACT

Process involving deposition of a conductive coating, followed by electrophorically depositing a continuous coat of particles onto a porous, nonconductive body, with subsequent heating to convert the deposited layer into an adherent cladding on the surface of the porous body.

7 Claims, 2 Drawing Figures

PATENTED JAN 14 1975

3,860,506

INVENTOR.
ROBERT F. NICKERSON

BY

ATTORNEY

ELECTROPHORETIC PROCESS FOR COATING CERAMICS

The present invention relates to a process for providing uniform coatings on electrically nonconductive bodies in general. More particularly, the present invention relates to a process wherein a coating of sinterable particles is electro-phoretically deposited on a nonconductive body and the deposition is converted into an adherent coating or cladding.

Coatings are commonly applied to nonconductive bodies to provide resistance to mechanical shock or chemical attack, or to simply enhance the appearance of such bodies. In the nuclear reactor art, for example, fuel or moderating elements may take the form of ceramic tubes, or more particularly beryllia tubes, containing a dispersed nuclear fuel such as uranium oxide. At the high temperatures present in nuclear reactors, beryllia is subject to attack by moisture in the environment. It is therefore desirable, or even imperative, to coat the exposed surfaces of the beryllia moderator elements with materials capable of withstanding corrosive attack by moisture at high temperatures. To withstand the hostile environmental conditions, the coating should be uniform and of reproducible minimum thickness, down to the order of several microns, to minimize extraneous material content, and should further have continuity of coverage to provide complete protection for the berylllia substrate.

Traditional coating processes such as dipping, spraying and painting are particularly inadequate with respect to uniformity and close control of thickness. However, electrophoretic deposition has been used previously for coatings of non-conductive, but sinterable materials such as ceramics and, more particularly, beryllia, in providing protective coatings of reasonable uniformity, continuity and thickness. The general aspects of the process of electrophoretic deposition is well known in the art and is discussed, for example, in the Encyclopedia of Chemical Technology, Volume 4, pp. 606–610, published by Inter-science Encyclopedia, Inc.

For a nonconductive body to be coated by such a process, the nonconductive body must be treated to serve as an electrode. This may be accomplished by applying an electrically conductive continuous film to the nonconductive body. However, after deposition of an electrophoretic coating over the thin, conductive film, the film often adversely affects the adhesion or continuity of the electrophoretic coating. For example, the coating may tend to be leached out, resulting in a weakening of the coating or development of voids between coating and substrate, or adverse reactions may occur due to the service conditions.

The prior art teaches the coating of a nonconductive body with graphite to permit electrocoating thereon, as well as the use of electrophoretic deposition with or without sintering to protectively or decoratively coat nonconductive bodies. However, prior methods for providing the necessary conductive graphite film, the particular characteristics of the electrophoretic coating technique and the composite process for applying a protective coating to nonconductive bodies have been found seriously wanting with respect to the properties of coating uniformity, minimum thickness, continuity and mechanical adhesion to the substrate without substantial penetration of the coating into the substrate.

It has been found that these problems are minimized and overcome by preparing the surface of the substrate and by electrophoretically depositing coatings as disclosed hereafter. The method of the present invention is particularly applicable to protective coating of nonconductive bodies having a presintered, porous or textured surface and comprises essentially the preliminary deposition of a very thin conductive film of graphite onto the surface to be coated, and then electrophoretically depositing particles of the requisite protective material onto said conductive film. The final product is obtained by heating the coated surface below the melting point of said protective material, e.g., in a hydrogen atmosphere, to remove the graphite film and sinter the substrate along with the electrophoretically deposited particles to achieve a continuous protective coating on said body surface.

Accordingly, the objects of the present invention are to: electrodeposit a protective film in intimate relation onto a nonconductive body; deposit a graphite film having uniformity, continuity and minimum thickness onto a nonconductive porous body; provide an improved electrophoretic deposition medium for depositing sinterable green coatings having superior qualities of uniformity, continuity, minimum thickness and adhesion; electrophoretically deposit, on a nonconductive porous body, a coating having uniformity, continuity, very minimum thickness and without substantial penetration into the substrate; achieve a zirconium oxide-yttrium oxide protective coating deposited directly onto a nonconductive beryllia substrate without an interdisposed, residual conductive film and without substantial penetration of the coating into the substrate and provide a method of depositing a uniformly, very thin graphite film onto a nonconductive porous beryllia body to facilitate electrophoretic deposition of a zirconium oxide-yttrium oxide coating of improved properties thereon, and then obtain a protective coating of zirconium oxide-yttrium oxide in directly bonded relation on the beryllia body by heating the electrophoretically coated body to remove the carbon film and sinter the zirconium oxide-yttrium oxide green coating to a continuous, very thin protective film.

Other objects and features of advantage will be apparent in the following detailed description, together with the drawings, in which the characteristics, variations and results of the subject process are set forth.

Figure 2:
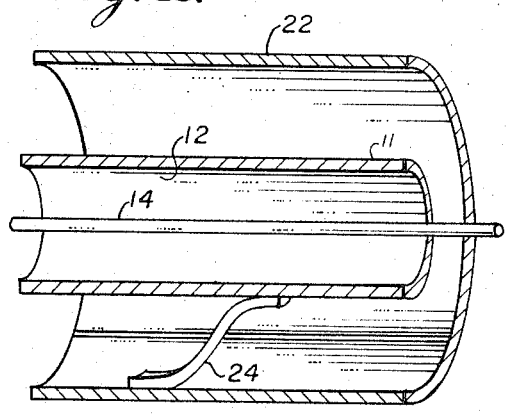

With reference to said drawings:

FIG. 1 illustrates apparatus employed for electrophoretic coating of the inner surface of a beryllia fuel element; and FIG. 2 is an enlarged view from FIG. 1, illustrating the spatial relation of the inner surface of the beryllia tube and the electrode employed for coating deposition.

In brief, the process of the present invention comprises the depositing of a conductive graphite film on a porous, sinterable substrate to be coated, electrophoretically depositing particles of a protective material on the graphite film and then heating the coated member in a hydrogen environment to convert the graphite film to a gaseous hydrocarbon product, thereby permitting its diffusion through the protective particles and to sinter the particle coating and substrate to form a continuous protective thin coating. To obtain the superior beneficial results, it is necessary to utilize graphite particles of a size just larger than the pores of the substrate and to control the viscosity of the graphite suspension medium, as well as the immersion time of the substrate therein, to provide a very thin continuous conductive film upon the substrate without penetration thereinto.

The present invention may be utilized for electrocoating a variety of nonconductive substrates, generally classified as porous inorganic bodies of natural or synthetic origin, for example, ceramics, vitreous materials, foamed or sintered particle glass, fibre mats, cinder, expanded minerals, etc. However, the present invention is particularly suited for coating nonconductive bodies having a porous or textured surface which promotes adhesion of a uniform film of graphite deposited by the present method. The present invention will be described in detail with reference to a preferred process for providing an improved protective coating beryllia hard fired; partially fired or green and other similar porous ceramic or vitreous bodies should behave likewise. The desirability and advantage of selecting a partially fired, unsintered beryllia body is further discussed hereinafter.

To permit the formation of uniform and continuous coatings, a conductive film is preferably deposited by immersing the nonconductive body in a suspension of finely divided graphite in a suitable medium, e.g., aqueous media. The operating characteristics of beryllia moderating elements in a nuclear reactor require that protective coatings or other materials do not penetrate substantially into the beryllia substrate. Similarly, minimal penetration is necessary to minimize density changes, etc., in other porous materials. Further, to produce the desired surface finish and body dimensions in the final product, the conductive film must be uniform and of very minimum thickness while maintaining continuity of conductivity over the entire substrate to permit uniform electrocoating thereon. Simply diluting the concentration of graphite in a common immersion medium such as water does not provide sufficient film uniformity since the surfaces first contacting the nonviscous suspension provided thereby soak up the solution rapidly and acquire a thicker graphite film than those surfaces subsequently contacting the medium.

Quite unexpectedly, it has been discovered that the necessary minimum thicknesses and film uniformity are achieved by employing an immersion suspension having preselected characteristics of graphite particle size, concentration, immersion medium viscosity, duration of immersion time carefully predetermined according to the size and surface complexity, particularly the surface pore size, of the body onto which the conductive film is to be applied. To prevent the conductive film or protective coating from penetrating excessively into the substrate body, the graphite particle size is selected to be just slightly larger than the maximum average pore size of the nonconductive substrate. On contact, the fluid portion of the immersion solution tends to penetrate into the porous substrate, but the suspended graphite particles are filtered therefrom to be gathered at the entrances of the substrate pores and adjacent interspatial surfaces because of the above-discussed size limitations. The viscosity of the solution determines the rate of penetration and hence the rate of deposition of graphite particles upon the nonconductive substrate. By controlling the concentration of graphite particles and the duration of immersion time, a predetermined quantity or thickness of graphite particles is deposited upon the substrate surface as a uniform thin layer interlocked into the pores. An extended immersion time permits the porous substrate to become saturated, halting the flow of the immersion solution into the substrate at which time no further deposition occurs. The deposited carbon particles then tend to migrate away from the surface and become re-suspended in the solution, and control over the deposition rate is lost. A suitably increased solution viscosity may be obtained by utilizing viscosity-increasing agents such as viscous, substantially fluid, polyhydric alcohol solvents, including ethylene glycol, propylene glycol or glycerin. Other possibilities would include viscosity-increasing agents, such as polyvinyl acetate or methyl cellulose added to water in varying proportions, e.g., 0.1 to several percent by weight. Such solutions have two major advantages. They permit better control of the film deposition and, since all parts of the substrate may not practically enter the solution simultaneously or be penetrated at a uniform rate, there is less film variation across the surface of the substrate. This procedure was found to produce a conductive film having surprisingly improved properties of uniformity and controlled thickness.

Although, as described below, the resultant graphite coating provides the conductive base layer for electrophoretic deposition, the graphite coating may also be used to provide a superior conductive base for electrocoating nonconductive bodies by such processes as electroplating or electrostatic deposition. Moreover, the above process may provide a superior method for depositing a film of any particulate conductive material, e.g., comminuted metal such as powdered aluminum, gold, silver, nickel, etc., which may remain as an intermediate coating or be removed as hereinafter discussed. The surface tension of the solution, also, is lower with such additives and a more uniform wetting action may also contribute to the beneficial results.

Once the graphite film is provided as disclosed herein, conventional electrophoretic deposition may be employed for deposition of a wide range of conductive or nonconductive coating materials. Suitable coating materials include any materials such as plastics, metals or ceramics which may be divided into fine semicolloidal or colloidal particles and treated, in the deposited form on a substrate, to provide a coating which is protective or decorative. However, an electrophoretically deposited coating composed of zirconium oxide and yttrium oxide in admixture is particularly comtemplated by the present invention to provide protection of beryllia against corrosion by water or water vapor at elevated temperatures. Electrophoretic deposition is inherently dependent on preparation of a coarse colloidal suspension of the coating material in a suitable organic medium and careful selection of the particle size of the material to be deposited. Suspensions in the range of about 0.1 to 10% by weight are typical. The colloidal particles exist in a charged state dispersed in the solvent or fluid medium of the suspension. Further, where a finely controlled coating is contemplated, as is here the case, careful selection of the suspension medium (sol) and operating parameters is necessary. The preferred carrier sol for the electrophoretic deposition step has been found to be nitromethane. The reason nitromethane is superior to other solvents is presumably due to the low viscosity which permits high particle velocity therethrough and the high density which decreases the particle settling rate. Low electrical conductivity, preventing gassing at the electrode surfaces, high dielectric constant for optimum suspension stability, and low vapor pressure to maintain a low evaporation rate and conserve solvent are further advantages offered by the use of nitromethane as a sol. Accordingly, although nitromethane is the preferred solvent, other solvents having comparable viscosity, density, conductivity and dielectric properties could be used in place of nitromethane, e.g., tetrabromoacetylene and similar nitrated or halogenated organic compounds or mixtures such as nitropropane-tetrabromoacetylene. To a lesser extent, common solvents, e.g., acetone, methanol, isopropanol, etc., may be employed where the coating characteristics are not as critical.

Further, stabilizers are employed in electrophoretic solvents to produce a stable suspension and maintain an optimum zeta potential. Activators are selected with specific reference to a particular electrophoretic solution. Activators employed with the above solvents include tannic acid, polyvinyl alcohol, chromium hydroxide and nickel hydroxide. Activators are employed in very critical ranges of concentrations, generally in the range of 50–100 mg/liter of suspension solution.

The coating materials to be applied to the body, specifically yttria and/or zirconia are introduced into the carrier sol in a finely divided state, e.g., by ball milling, colloidal milling or other convention procedures. The selection of the particle size and distribution is critical because deposited coatings composed of small particles may exhibit as much as 30–60% void space which is commonly occupied by the solvent. On drying the coating to remove the solvent and further treating, e.g., by sintering to transform the coating to a continuous, protective nature, the coatings commonly exhibit shrinkage or contraction. This contraction commonly results in cracking which may be more or less severe according to the coating thickness, but is always a problem when the coating is required to be reliably protective and hence of a necessarily continuous nature. To achieve such a continuous coating, careful attention must be paid not only to the hereinabove discussed solution characteristics, coating particle size and physical coating parameters, but also characteristics such as voltage, electrode separation, current density and particle concentration which are of common concern in electrophoretic deposition. Particle size may generally be of the order of a maximum of ten microns down to as low as, for example, 0.1 microns, in such deposition applications. For a process where a coating thickness of the order of 1 mil is desired, it has been found necessary to use zirconium oxide-yttrium oxide particles in the range of substantially 0.5–1 micron. Coatings of particles below such a range permit excessive solvent retention in the green coating, while larger particles result in nonuniform thickness. The use of particles either under or over this size range results in sintered coatings which exhibit cracks or undesirable discontinuity. Uniform dispersion of a critical concentration, i.e., 0.5–1% of particles in the suspension, may be achieved by such techniques as ball milling, grinding or blending.

Electrophoretic deposition inherently requires that the surface to be coated serve as one electrode with the arrangement including an opposing electrode. Polarity of each electrode depends on the material to be coated in accordance with known principles. Fine control is obtained by regulating the distance between electrodes, applied voltage and duration, conformity of the surface of the opposing electrode to the surface to be coated; the use of baffles to prevent excess agitation in the immediate vicinity of the surface is of advantage as in usual practice.

It is usually desirable to sinter the green coating resulting from the electrophoretic deposition step. The sintering of the electrophoetically deposited coating may be performed according to known techniques appropriate to the nature of the material as in conventional practice. For many purposes, the coated body is heated to just below the fusing or melting point or to the sintering point of the coating particles and maintained at that temperature for a predetermined time. The individual particles of the green coating are thereby caused to coalesce, sinter or fuse together to form a continuous protective coating.

In general, by the present coating process, a nonconducting body may be protectively coated in a manner achieving heretofore unattainable properties of uniformity, continuity and minimum coating thickness. Specifically, the coatings are characterized by a firm bond of the coating to the substrate which is mechanically strong, while remaining well-defined, i.e., there is substantially no diffusion of the coating into the substrate. To achieve the maximum degree of these properties, the graphite film and the electrophoretic coating, for example, zirconium oxide and yttrium oxide, are deposited over a nonconductive ceramic body, for example beryllia, which is fired to a predetermined hardness and density.

As hereinbefore discussed, the size of the graphite particles is selected to be just greater than the pore size of the green fired beryllia body. Thus, a very thin uniform carbon film having electrical continuity is deposited substantially solely on the surface of the beryllia body. After electrophoretic deposition of the zirconia-yttria coating, the coated body is slowly heated to the sintering temperature of the coating in an atmosphere of excess hydrogen gas. The hydrogen gas reacts with the graphite film, forming hydrocarbon gases which escape through the interstices of the coating particles. Other conductive coating may be eliminated by vaporization, reaction or other procedures if desired. As hereinbefore discussed, the electrophoretic coating tends to contract on sintering and possibly develop surface stresses in doing so. It was found that the tendency of the coating to crack upon sintering can be minimized or eliminated by green firing the ceramic substrate to a predetermined hardness such that the substrate is densified and contracted to a state which, during the sintering, will densify or contract preferably to a somewhat greater degree than the coating. Thus, the coating shrinks directly onto the substrate surface and occupies the void created by removal of the graphite layer. By matching the contraction of the coating to the contraction of the substrate, stresses in the final sintered coating are minimized with a correspondingly minimized tendency to crack. Since the carbon film was deposited on the surface of the substrate, the sintered or fused electrophoretic coating is also limited essentially to the surface of the substrate. Removal of the graphite film in hydrogen and sintering of the electrophoretic coating to cause slight contraction thereof with respect to the substrate results in a residual coating having highly enhanced adhesion to the substrate with substantially no diffusion of the sintered coating into the substrate.

With these basic concepts in mind, the described process may be performed with appropriate variations, such as those hereinabove discussed, with the usual attention to the nature of the materials, substrate configuration to be used and characteristics of the coating. While the process is generally applicable to ceramics, a preferred example of the process for producing reactor fuel elements containing beryllia is set forth in detail below.

ELECTROPHORETIC DEPOSITION OF A ZIRCONIUM OXIDE-YTTRIUM OXIDE PROTECTIVE COATING ON THE INTERIOR SURFACE OF BERYLLIA TUBES

Moderating elements in certain nuclear reactors are commonly fabricated in the form of tubes from beryllia impregnated with enriched uranium. Such elements may operate at temperatures of 1400° C or greater. Although beryllia is a good moderator, has good high temperature strength and is a good refractory material, water vapor present in atmospheric air passing through the moderator tubes at these temperatures reacts with exposed beryllia to form a volatile product, presumably beryllium hydroxide $(Be(OH)_2)$, to erode the element. For this reason, it is necessary that the beryllia tube interior be completely protected by a coating which will not be affected by water vapor at elevated temperatures for which purpose a coating of zirconia-yttria is admirably suited.

Referring now to FIGS. 1 and 2, moderator tubes 11 were composed of electrically nonconductive porous green, i.e., starch-binder formed, calcined beryllia which was not completely fired or densified, i.e., the green composite is air fired to remove binder at low temperature so that no sintering takes place. The porosity of the tubes was approximately 50 percent. The average pore size of the tubes was measured directly or estimated in accord with experimental results hereinafter discussed. Typical pore size may be in the range of 0.5–5 microns. The tube surfaces, particularly the interior surface 12, were degreased by normal procedures, i.e., by heating in air or by use of degreasing solvents such as trichloroethylene.

A 0.15 weight percent solution of finely divided graphite in ethylene glycol (and a small amount of water) was prepared by blending approximately 0.5–2 parts of AQUADAG in 100 parts of ethylene glycol. AQUADAG is a trademark of ACHESON COLLOIDS COMPANY referring to a colloidal suspension of graphite. The graphite particles of the procured AQUADAG were found to be sufficiently well divided and, by experimentation, were found to coat on the beryllia substrate with substantially no penetration thereinto. AQUADAG is further defined by the manufacturer as a 30 percent dispersion by weight of 0.5 micron graphite particles in water. The subject dispersion was simply prepared by mixing in a Waring-type blender or homogenizer.

The tube was immersed in the graphite suspension with its entire surface exposed to the graphite solution. Immersion time was limited to the order of 5 seconds, which resulted in a continuous graphitic film, having a uniform thickness of approximately 0.5–2 microns, and providing conductivity over the entire interior tube surface. The graphite film thus deposited possessed sufficient adhesion to the substrate to permit removal of excess solution by air drying without damage to the graphite film.

To electrophoretically deposit a zirconia-yttria coating of approximately 1–2 mils thickness to the interior or conductive surface of the tube, an electrophoretic solution was prepared with the following approximate constituency:

15 grams of yttria-stabilized zirconia (tradename Zircoa), $ZrO_2-Y_2O_3$
0.15 grams tannic acid
260 ml of nitromethane Zircoa is a trademark of Zirconium Corporation referring to an 85 weight percent $ZrO_2$, 15 weight percent $Y_2O_3$ solid solution of high purity, minus 325 mesh size particles. The tannic acid employed was a commercial grade. The nitromethane is available from commercial sources.

The yttria-stabilized zirconia, tannic acid and approximately 10 ml of nitromethane were milled in a tungsten carbide Pica Mill (i.e., a ball mill) for 30 seconds. The resulting slurry was added to 250 ml of nitromethane while mixing in a Waring blender for approximately 1 minute. The resulting suspension was poured into a 250 ml graduate and allowed to stand for 1 hour to separate larger particles by precipitation. Then, the suspension disposed in the upper 25 cm (linear) was decanted off for use and continuously stirred to prevent settling.

Electrophoretic deposition of the zirconia-yttria particles onto the interior tube surface made conductive by the graphite film is carried out in standard equipment described with respect to FIGS. 1 and 2. Beryllia tube 11, having an inner surface 12 to be coated, was disposed within coating assembly 13 with standard apparatus to permit the electrophoretic suspension to flow therethrough while deposition voltage was applied between tube 11 and stainless steel rod 14. Base 16 supports inlet mandrel 17 and outlet mandrel 18 in axial alignment. Mandrel 17 includes suspension inlet port 19, and mandrel 18 includes suspension outlet port 21. Inlet and outlet ports 19 and 21 are further adapted to connect with external suspension circulating means, for example, a pump and accompanying tubing (not shown). The ends of stainless steel tubular shell 22 fit respectively into mandrels 17 and 18. Tube 11 is centrally disposed within shell 22 by means of adapter rings (not shown). The length of the tube 11 was disposed between inlet and outlet ports 19 and 21. The suspension flow path between inlet and outlet ports 19 and 21 was channeled through the interior of tube 11 by washers (not shown) disposed in flush relation to shell 22 and either end of tube 11, and having an inside diameter approximately equal to the inner diameter of tube 11. Stainless steel electrode rod 14 penetrated mandrel 17 distal shell 22 and tube 11 by means of a rubber insert (not shown) which provided electrical insulation between rod 14 and mandrel 17 and prevented liquid flow therethrough. Rod 14 extended through mandrel 17 toward mandrel 18 at least the entire length of tube 11 and was maintained in equiconcentrical relation with the inner surface 12 of tube 11. The graphited surface of tube 11 was maintained in electrical connection with shell 22 by means of a spring clip 24 extending inwardly from the inner surface of shell 22 to contact the outer surface of tube 11. An external electrical source capable of maintaining at least a 600 volt potential (not shown) was connected in series with end 25 of rod 14 and shell 21. (Voltages, e.g., 300–1000 v may be used as appropriate for times from a few seconds to minutes or more if thick coatings are desired.) By means of clip 24, the inner graphited surface of tube 11 was maintained at an electrical potential with respect to rod 14. For the method and coating materials of the present invention, rod 14 and shell 22 was connected with the external electrical source so that rod 14 and tube inner surface 12 of tube 11 are respectively cathode and anode.

The above-described apparatus may be further modified to permit rotation of tube 11 and shell 22 with respect to rod 14. Uniformity of an electrophoretically deposited coating is very dependent on electrode spacing and the surface configuration of coating electrodes. Such rotation serves the dual purpose of offsetting any irregularities of surface or relative spacing of rod 22 or inner tube surface 12, as well as providing a means of centrifugally removing the electrophoretic solution from the finally-deposited coating at the conclusion of coating.

In operation, the above-described electrophoretic solution was circulated through the anode-cathode anodic inner surface 12 – cathodic rod 14 annulus by means of inlet and outlet ports 19 and 21 at a rate of approximately 300 ml/min. A voltage of approximately 600 v was applied between graphitic anode surface 12 and cathodic rod 14, and maintained for approximately 5 seconds. Circulation of the solution was halted and a large part of the nitromethane remaining within the electrophoretic coating was permitted to evaporate, for example, at room temperature over a period of 5 hours. The interior graphitic surface of the beryllia tube was thus uniformly coated with zirconia-yttria particles to a thickness of approximately 1–5 mils. At this point, green strength of the zirconia-yttria coating was sufficient to maintain its uniform adherence to the beryllia substrate and graphitic film.

The coated beryllia tube was then placed in an oven in a flowing hydrogen atmosphere at ambient temperature. The coated surfaces of the tube were disposed to permit free access of the hydrogen gas thereto. The temperature of the oven was raised at a substantially constant rate from ambient to approximately 1700° C in a period of approximately 20 minutes, i.e., approximately 85° C/min. Before the zirconia-yttria particles reach the sintering or fusing temperature, i.e., 1700° C, hydrogen gas penetrates between the interstices of the zirconia-yttria particles, and reacts with the graphite particles to form gaseous reaction products. These gaseous products emerge through the coating interstices and are carried away by the flowing hydrogen atmosphere. The graphite particles were substantially completely removed within the above 20-minute period.

The coated beryllia tube was then maintained at the sintering temperature of 1700° C for approximately 4 hours. Heating the body produces two effects: sintering of the coating so that it is fused and transformed into a continuous protective coating; and firing the beryllia body to its finished or final hard-fired and densified form. The inherent contraction of the sintered coating is substantially offset and matched by contraction or densification of the beryllia substrate. The final sintered beryllia tube is permitted to uniformly cool from 1700° to 700° C over a period of approximately 15 minutes. Further cooling may be permitted at ambient conditions. The above process, with particular emphasis on the dual effect of the final heating period, results in a protective coating of previously unachieved properties.

The coating is uniform and very thin, e.g., ±0.1 mils, of excellent mechanical adhesion in direct contact with the beryllia substrate, and relatively free from disruptive stresses.

EXAMPLE

Beryllia moderator tube 11 was selected to have a length of 32 mm and an inside diameter of 6 mm. Further, nonconductive, porous, green, i.e., a starch-binder formed beryllia tube was fired in air to remove the binder. Pore size of tube 11 was experimentally determined to be just greater than 0.5 microns. To apply a 1 mil thick, continuous, uniform coating of zirconia-yttria to the inner surface thereof, the method of the present invention was performed under the following conditions:

Step 1. Tube 11 was immersed for 5 seconds in a solution of 0.5 parts AQUADAG (3.0 w/o dispersion of 0.5 micron graphite particles in water) in 100 parts ethylene glycol. Tube 11 was then permitted to dry in air for 1 hour.

Step 2. Graphite-coated tube was placed in the coating apparatus of FIG. 2 as hereinabove discussed. Rod 22 was selected to have a diameter of 0.060 inch.

An electrophoretic suspension was prepared by ball milling and blending, as discussed above, to have a constituency of 15 grams yttria-stabilized zirconia, 0.15 grams tannic acid, and 260 ml of nitromethane. Said suspension was circulated through tube 11, as discussed above, at a rate of 300 ml/min and simultaneously an electrical potential of 600 volts was applied across cathodic rod 22 and inner tube surface 12 for 5 seconds. Tube 11 was removed from the coating apparatus and dried at room temperature for 5 hours.

Step 3. Coated beryllia tube 11 was placed in a flowing hydrogen environment within an oven at ambient conditions and heated to 1700° C at a rate of 85° C per minute.

Step 4. Beryllia tube 11 was maintained at the sintering temperature of 1700° C for 4 hours, cooled to 700° C at a uniform rate of 70° C per minute and permitted to cool further at room temperature.

While the present invention has been described with particular respect to a single example or embodiment, it is apparent that numerous modifications and variations are possible within the present invention in view of numerous modifications and variations set forth in the preceding description. Accordingly, the foregoing description is not intended to limit the present invention except by the terms of the following claims.

What is claimed is:

1. In a process for providing a continuous coating directly upon a solid green starch binder-formed, nonconductive body, the steps comprising:

air-firing said nonconductive green body to a starch-burned state in which at least the surface is porous;

contacting said body with a suspension of colloidal graphite particles having a particle size generally as large as the average dimensions of the pores of said porous body to deposit a thin, continuous film of graphite particles on the surface thereof;

disposing said graphite-coated body in an electrophoretic suspension of coating particles and applying an electrical potential between said graphite film and an electrode in said suspension to deposit a continuous coating of said particles over said graphite film;

heating said particle-coated body to a temperature approaching the sintering temperature of the coating particles in a flowing hydrogen atmosphere and maintaining said temperature sufficiently long to convert said graphite film to a gas and diffuse said gas through said particle coating; and then heating said particle-coated body to at least the sintering temperature of the coating particles to sinter the coating particles and fire the body to a final hard form.

2. The process of claim 1, wherein said film of graphite particles is deposited onto the surface of said body by immersing said body in said colloidal suspension of said graphite particles in a solvent of predetermined viscosity for a period of time sufficient to allow uniform deposition of a graphite particle surface film of predetermined thickness.

3. The process of claim 2, further defined in that said suspension comprises ethylene glycol having approximately 0.15 weight percent dispersion of said graphite particles.

4. The process of claim 1, further defined by said coating material being a sinterable protective ceramic.

5. The process of claim 4, further defined by said coating being a zirconia-yttria composite, and said substrate being starch-burned beryllia of approximately 50 percent theoretical density.

6. The process of claim 5, further defined by selecting said zirconia-yttria coating particles to be 85% zirconia by weight and 15% yttria by weight, and having a particle size passing through standard 325 mesh.

7. The process of claim 6, further defined by selecting the electrophoretic deposition bath to comprise approximately 15 parts by weight yttria-stabilized zirconia having 85% by weight of zirconia and 15% by weight of yttria of minus 325 mesh size, 0.15 parts by weight of tannic acid, and 294 parts by weight of nitromethane.

* * * * *